United States Patent
Pfaff et al.

[19]

[11] Patent Number: 5,889,193
[45] Date of Patent: Mar. 30, 1999

[54] DEVICE FOR ASCERTAINING A RATE OF ROTATION

[75] Inventors: Georg Pfaff, Markgroeningen; Rainer Erhardt, Stuttgart; Johannes Artzner, Reutlingen; Wolfram Bauer, Tuebingen, all of Germany

[73] Assignee: Robert Bosch GmbH, Stuttgart, Germany

[21] Appl. No.: 875,151

[22] PCT Filed: Dec. 15, 1995

[86] PCT No.: PCT/DE95/01796

§ 371 Date: Jun. 27, 1997

§ 102(e) Date: Jun. 27, 1997

[87] PCT Pub. No.: WO96/21138

PCT Pub. Date: Jul. 11, 1996

[30] Foreign Application Priority Data

Dec. 29, 1994 [DE] Germany ............ 44 07 005.3

[51] Int. Cl.$^6$ ............................................. G01P 21/00
[52] U.S. Cl. ......................................... 73/1.37; 73/504.13
[58] Field of Search .................................... 73/1.37, 1.77, 73/504.13, 504.12, 504.14, 504.15, 504.16

[56] References Cited

U.S. PATENT DOCUMENTS

| | | | |
|---|---|---|---|
| 4,654,582 | 3/1987 | Ito | 73/178 R |
| 4,759,220 | 7/1988 | Burdess et al. | 73/504.13 |
| 5,426,970 | 6/1995 | Florida et al. | 73/1.37 |
| 5,652,374 | 7/1997 | Chia et al. | 73/504.12 |

FOREIGN PATENT DOCUMENTS 0 462 580 A1  12/1991  European Pat. Off. .
0 638782 A1   2/1995   European Pat. Off. .

*Primary Examiner*—John E. Chapman
*Attorney, Agent, or Firm*—Michael J. Striker

[57] ABSTRACT

A rotation rate sensor is described that operates on the principle of a resonant vibration gyrometer and is excited by an amplitude-regulated oscillator loop. This sensor is used for instance to ascertain the yaw speed of a vehicle. The effect of Coriolis acceleration is evaluated, which is a measure for the current yaw speed. To monitor the operability of the sensor and the associated electronics, an integrated self-test function is used, which as a so-called BITE function introduces a defined interference variable after actuation of a test input. This defined interference variable leads to an estimatable output voltage, whose occurrence is evaluated for error detection.

6 Claims, 2 Drawing Sheets

5,889,193

DEVICE FOR ASCERTAINING A RATE OF ROTATION

BACKGROUND OF THE INVENTION

The invention is based on a device for ascertaining a rate of rotation.

The use of rotation rate sensors, which function for instance on the principle of a vibration gyrometer, in conjunction with systems for regulating the driving dynamics of motor vehicles is already known. Such sensors evaluate the effect of the Coriolis acceleration, which serves as a measure of the actual yaw speed of the vehicle.

Such a rotation rate sensor is described for instance by U.S. Pat. No. 4,759,220. In that patent, the typical construction of such a sensor and the associated evaluation circuit are described in further detail. Essentially, this sensor is a thin-walled hollow cylinder of elastic material. A plurality of piezoelectric sensor elements are mounted on the cylinder wall, with two sensor elements at a time facing one another. These sensor elements are set into constant mechanical drive oscillations with the aid of an oscillator loop. The Coriolis effect, together with a rotary speed coupled in vertically to the drive oscillation, brings about a Coriolis acceleration, which causes a deflection of the drive oscillation in the Coriolis direction. This deflection is a measure for the coupled-in rate of rotation. The resultant output voltage is ascertained with the aid of a detector circuit and finally is utilized to determine the rate of rotation.

The sensor along with the associated evaluation circuit known from U.S. Pat. No. 4,759,220 has the disadvantage that a malfunction cannot readily be detected. If such a sensor is used in conjunction with systems relevant to safety in a motor vehicle, then it is necessary that the operability be monitored.

SUMMARY OF THE INVENTION

The device according to the invention for ascertaining a rate of rotation has the advantage over the known version that a malfunction of the sensor is reliably detected. An especially advantageous aspect is that only little additional expense is required, and as a consequence of the reliable sensor monitoring, the expense for redundant sensors can be markedly reduced.

The advantages are attained in that an offset signal is coupled, correctly in-phase, into the compensation loop of the evaluation circuit, thus mistuning the compensation loop. A superposition of the rotation rate and offset is then indicated at the output of the sensor or evaluation circuit, and from this indication the operability is detectable directly.

Further advantages of the invention are attained with the aid of the provisions recited in the dependent claims. It is especially advantageous that the offset can be imposed by actuating a test input, thus making the sensor testable, given a known mistuning. A more-extensive test is possible, since the test function, because of the loop arrangement, tests both the evaluation electronics and the sensor element itself for malfunction. The coupling-in of an interference variable, a so-called BITE function, that corresponds to a fixedly set rotation rate has the advantage that the sensor output, because of the interference variable, is independent of the sensitivity calibration.

BRIEF DESCRIPTION OF THE DRAWING

The invention is shown in the drawing and described in further detail in the ensuing description. Specifically.

DESCRIPTION OF THE PREFERRED EMBODIMENTS

Figure 1:
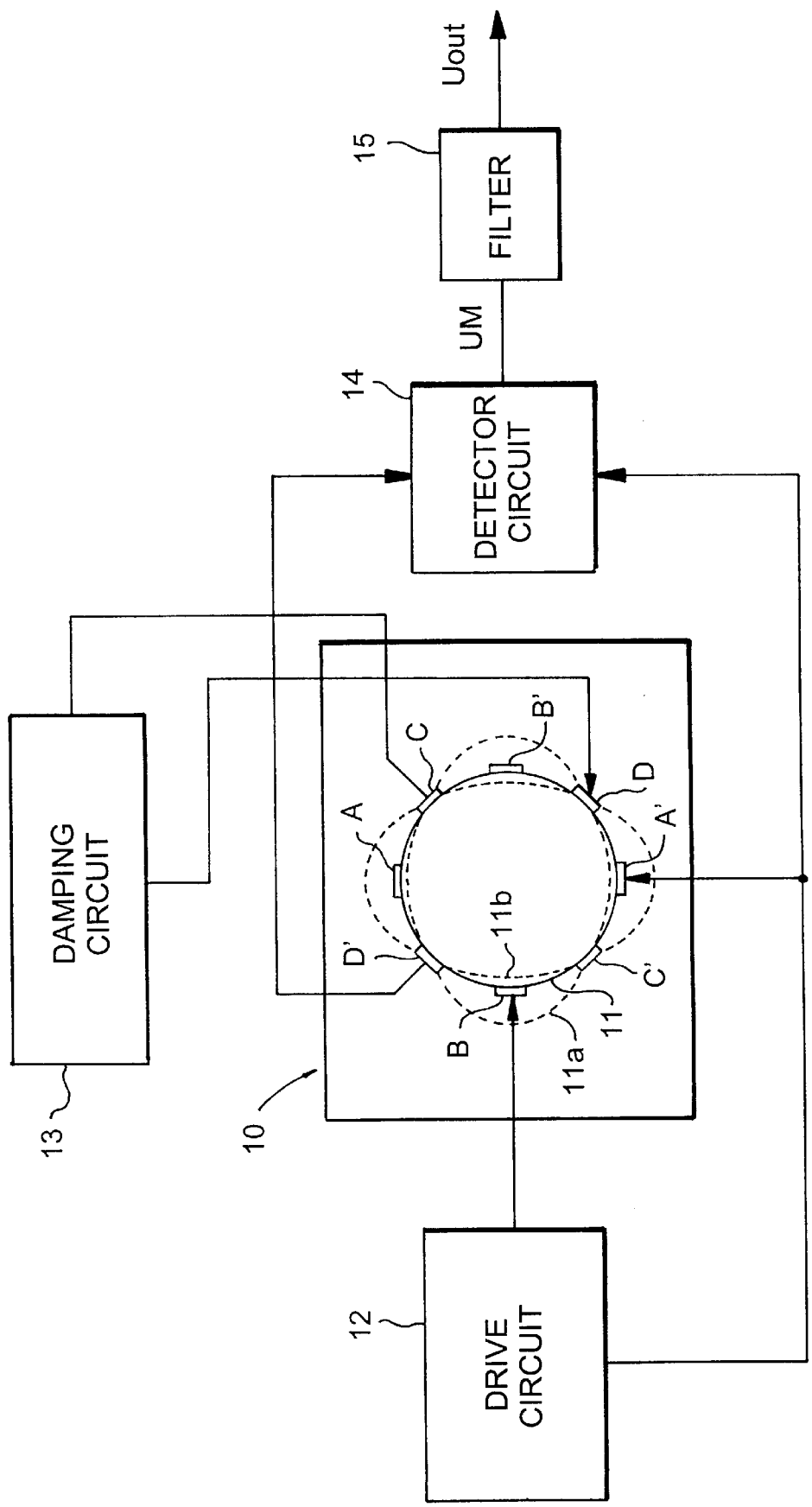
FIG. 1 shows a sensor arrangement together with an evaluation circuit of the kind known from U.S. Pat. No. 4,759,220.

In FIG. 1, the sensor is identified by reference numeral 10. The hollow cylinder 11 of the sensor 10 carries the individual measuring elements A, A', B, B', C, C' and D, D'. The deformations that the hollow cylinder 11 can assume as a result of oscillations are shown in dashed lines.

The measuring elements A, B, C, D are connected to blocks 12, 13, 14 of the electronics; 12 indicates the oscillator loop (drive circuit), which sets a suitable sensor element into a constant mechanical drive oscillation. 13 indicates a damping circuit, and 14 represents the detector circuit, at whose output the measurement signal appears, which signal is then filtered suitably in the filter 15 such that the actual output signal Uout is obtained.

With the sensor arrangement shown FIG. 1 along with the electronics of a rotation rate sensor that operates by the principle of a vibration gyrometer, the yaw speed or rate of a vehicle can be ascertained. The Coriolis effect, together with a rotational speed coupled in vertically to the drive oscillation, brings about a Coriolis acceleration, whose consequence is a deflection of the drive oscillation in the Coriolis direction. This deflection is finally a measure for the coupled-in rate of rotation and is to be measured.

Figure 2:
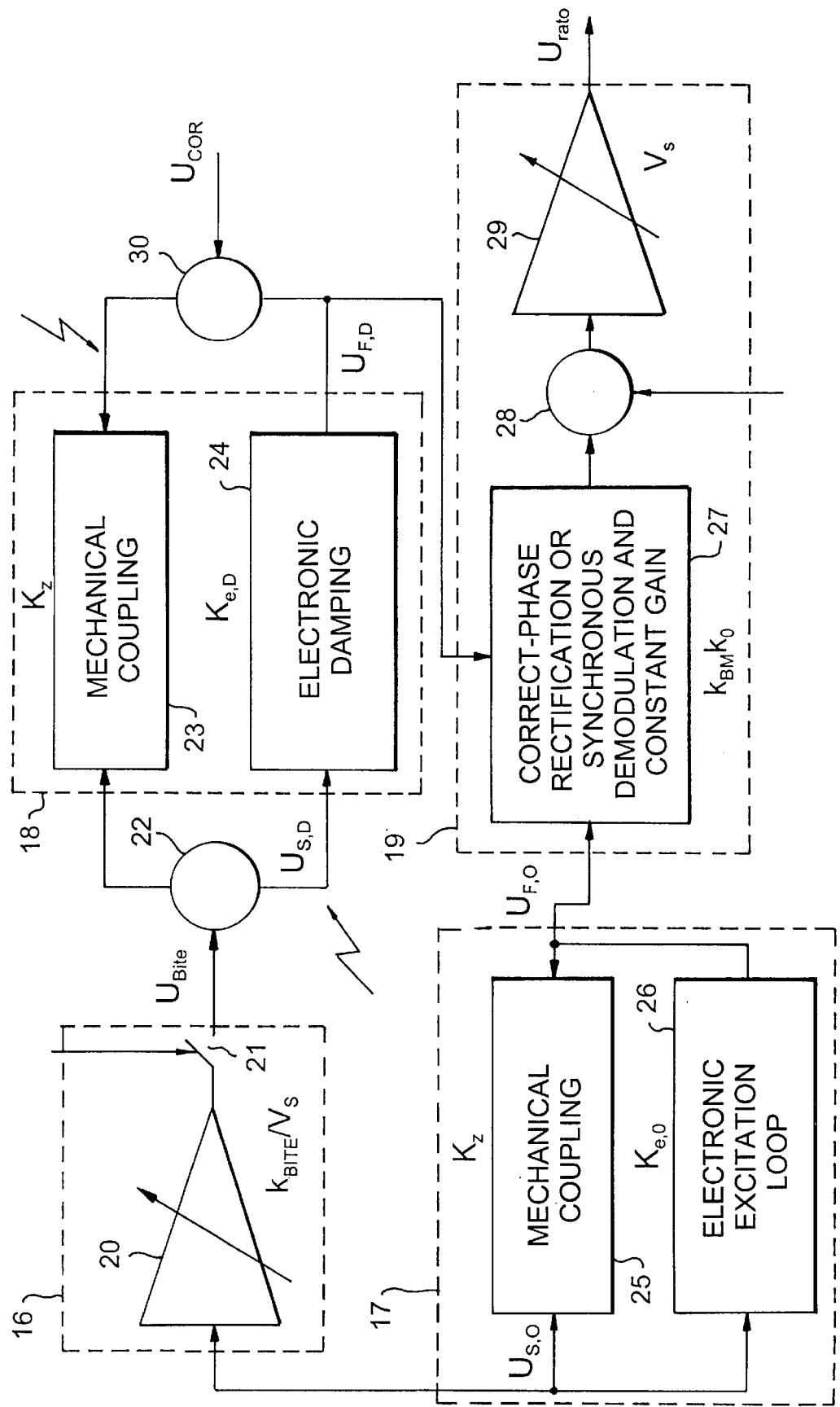
FIG. 2 shows the exemplary embodiment of an evaluation circuit according to the invention, which permits monitoring of the operability of both the sensor and the evaluation circuit itself.

In FIG. 2, the evaluation circuit of an embodiment according to the invention is shown. In this version, the sensor and the associated electronics are coupled with one another. Essentially, the arrangement shown includes four blocks. The first block 16 is the so-called BITE block; the oscillator loop is marked 17; the damping loop is marked 18; and the output stage has reference numeral 19.

Blocks 16–19 found in FIG. 2 are subdivided in turn into other blocks. The interactions between the various blocks are indicated by corresponding connecting lines, as applicable with the indication of the direction of action by suitable arrows. In detail, the BITE block 16 includes an amplifier 20 of variable gain, in which the BITE function is generated. This function is symbolized by the expression $k_{BITE}/v_S$. Via the BITE switch 21, it is passed on as a BITE interference variable $U_{BITE}$ to the point 22 when a BITE test is tripped. This point 22 communicates with blocks 23, 24 of the damping loop 18. Block 23 designates the mechanical coupling (of the cylinder and measuring elements or in other words piezoelectric elements). The transfer function of the sensor element is marked $k_Z$.

Block 24 is an electronic damping loop with phase control from the AFC and with constant gain. The associated transfer function of the electronic damping loop is designated as $k_{e,D}$. At point 22, the electrical zero point adjustment also takes place. The voltage applied to point 22 is designated $U_{S,D}$.

Of the oscillator loop 17, two blocks 25, 26 are shown, which interact with one another. Block 25 in turn designates the mechanical coupling between the cylinder and piezoelectric elements. The transfer function of the sensor element is $k_Z$. The voltage is designated as $U_{S,O}$. This is the sensing voltage of the oscillator loop; the voltage of excitation of the system, that is, the driver voltage, is designated $U_{F,O}$, and this voltage is also called the force or drive voltage.

Block 26 designates the electronic excitation loop, with a phase controller (AFC) and amplitude controller (AGC). The associated transfer function of the oscillator loop is designated $k_{e,O}$.

The drive voltage or force voltage $U_{F,O}$ is applied to the junction between blocks 25 and 26 and is supplied to block 27 for the correct-phase rectification or synchronous demodulation and constant gain of the output stage 19. Block 27 also receives the voltage $U_{F,D}$ from the damping loop 18. The transfer function of block 27 is designated as $k_{BM} \cdot k_0$. A point 28, at which the offset calibration takes place is shown at the output of block 27. Point 28 is followed by an amplifier 25 of variable gain, and the gain is designated as $v_S$. At the output of the amplifier 29, the rotation rate output voltage $U_{rate}$ can be picked up, which is a measure for the rotation rate that is actually present.

The mechanical zero point adjustment is done at point 30. For this zero point adjustment, a voltage $U_{cor}$ is fed in as an electrical equivalent of the Coriolis effect.

With the arrangement shown as a block circuit diagram in FIG. 2, the rotation rate sensor can be evaluated and at the same time monitoring of proper operability of the sensor and evaluation circuit itself can be done.

If a suitable sensor element, which is located on the hollow cylinder, is set into a constant mechanical drive oscillation by the amplitude-regulated oscillator loop, then the Coriolis effect, together with a rotary oscillation coupled in perpendicular to the drive oscillation, brings about a Coriolis acceleration, which causes a deflection of the drive oscillation in the Coriolis direction. By means of these effects, the hollow cylinder on which the piezoelectric elements acting as measuring elements are disposed is additionally set into oscillation. Because of the excitations by the oscillator, the hollow cylinder fluctuates between the limits shown in dashed lines in FIG. 1.

If a compensation loop, for instance a servo loop, is used to evaluate the deflection, which as already noted is a measure for the coupled-in rate of rotation, then the resultant controlled variable is a measure of the rotation rate to be measured. If this compensation loop is mistuned with an offset signal coupled in in correct phase, then the output of the sensor will indicate the superposition of the rotation rate and offset. This offset is generated in the BITE block. The imposition of the offset can be done for instance via actuation of the BITE switch 21, and the sensor then becomes testable, given a known mistuning. Since the test function, because of the loop arrangement, affects both the evaluation electronics and the sensor element, both can be tested for malfunction.

The derivation of the voltage $U_{rate}$ occurring at the output of the sensor when the BITE function is activated can be done on the basis of the following concepts for a vibration gyrometer with an amplitude-regulated oscillator loop, in which a sensor element is set into a constant mechanical drive oscillation. The drive oscillation has the speed $v_0$; it is proportional to the drive voltage $U_{F,O}$ of the oscillator loop.

For the oscillator loop, the following equations apply:

$$k_Z \cdot k_{e,O} = 1$$

$$|k_Z| \cdot |k_{e,O}| = 1$$

$$arc\ (k_Z) + arc\ (k_{e,O}) = 0°$$

$$|U_{F,O}| = const\ (AGC\ function;\ excitation)$$

$$v_O \sim U_{F,O}$$

$$arc\ (v_O) = arc\ (U_{F,O})$$

$$U_{S,O} = k_Z \cdot U_{F,O}$$

The ground element, which is located in an amplitude-regulated drive oscillation and has a certain current speed, undergoes a deflection in the Coriolis direction as a consequence of a rotation rate $\Omega$; the force $F_c = 2\ m\ v_O \times \Omega$. The compensation force or compensation voltage (controlled variable $U_{F,D}$), which counteracts the Coriolis force (guide regulation), is a measure of the existing rotation rate. The detection of the Coriolis voltage and the buildup of the countervoltage $U_{F,D}$ are effected in a compensation loop (damping loop).

The two loops are coupled via the sensor element and in the case described function in resonant fashion (that is, the transfer function $k_Z$ is the same for the oscillator loop and the damping loop).

For the damping loop the following equations apply:

$$|k_Z| \cdot |k_{e,D}| >> 1$$

$$arc\ (k_Z) + arc\ (k_{e,D}) \approx -180°$$

$$U_{cor} = k_c \cdot \Omega \cdot U_{F,O}$$

$$U_{F,D}(\Omega) \frac{kZ \cdot Ke,D}{+1 - k_Z \cdot k_{e,D}} \cdot U_{cor} \approx -U_{cor} = -k_c \cdot \Omega \cdot U_{F,O}$$

The guide regulation of the damping loop functions in the same way for coupled-in interference signals BITE (for "built-in test", with suitable frequency and phase relationship). A rotation rate can thus be simulated by coupling in an interference variable $U_{BITE}$. The coupling in is effected from the oscillator loop, which has the additional advantage of the oscillator test.

The interference signal should correspond to a fixedly set rotation rate, regardless of the sensitivity correction of the complete sensor that is necessary at the end of the band. This has been achieved by means of two amplifier stages (one in the BITE/damping loop and one in the output loop) with reciprocal gain. As a consequence, and because of the interference variable $U_{rate}$ (BITE), the sensor output is independent of the sensitivity calibration vs.

For the BITE arrangement, the following equations apply:

$$U_{BITE} = \frac{k_{BITE}}{v_S} \cdot U_{S,O} = \frac{k_{BITE}}{v_S} \cdot k_Z \cdot U_{F,0}$$

$$U_{F,D}(BITE) = \frac{k_{E,D}}{1 - k_Z \cdot k_{e,D}} \cdot U_{BITE} = -U_{BITE} \cdot \frac{1}{k_Z}$$

$$U_{F,D}(BITE) = -\frac{k_{BITE}}{v_S} \cdot U_{F,O}$$

The output of the sensor $U_{rate}$, with BITE activated, shows the sum (superposition) of the current rotation rate n and the simulated rotation rate, based on the fed-in interference variable.

$$U_{F,D} = U_{F,D}(BITE) + U_{F,D}(\Omega)$$

$$U_{F,D} = -\left(\frac{k_{BITE}}{v_S} + k_c \cdot \Omega\right) \cdot U_{F,O}$$

$$U_{rate} = (k_{BM} \cdot k_O \cdot |U_{F,D}| \cdot \cos(arc(U_{F,D} \cdot U_{F,O})) + U_{off}) \cdot v_S$$

$$U_{rate} = \left(-\left(\frac{k_{BITE}}{v_S} + k_c \cdot \Omega\right) \cdot (|U_{F,O}| \cdot k_{BM} \cdot k_0) + U_{off}\right) \cdot v_S$$

$$U_{rate}(BITE) = -k_{BM} \cdot k_0 \cdot k_{BITE} \cdot |U_{F,O}| \neq f(v_S)$$

The activation of the interference variable is done by actuating a test input, which makes the sensor testable, given a known mistuning $U_{rate}$ (BITE). By means of this test, not only the complete drive, damping and output electronics but also the sensor element with its terminals can be tested for malfunctions.

Summary of the abbreviations:
$k_Z$=transfer function of the sensor element
$k_{E,XX}$=transfer function of the electronics
$U_{S,XX}$=pickup voltage
$U_{F,XX}$=drive voltage
   XX=O=oscillator loop (excitation)
   XX=D=damping loop (compensation)
$v_0$=speed of the ground element in the driver direction
$\Omega$=rotation rate
$U_{cor}$=electrical equivalent of the Coriolis effect
$k_c$=Coriolis constant
$U_{BITE}$=bite interference variable
$k_{BITE}$=bite scaling factor
$k_{BM}$=gain of the balanced modulator
$k_0$=constant gain, output stage
$v_S$=variable gain of the output stage (sensitivity calibration at the end of the band)
$U_{off}$=compensation voltage of the zero rotation rate (set calibration at the end of the band)
$U_{rate}$=rotation rate output voltage

We claim:

1. A device for ascertaining a rate of rotation, comprising a sensor that has a plurality of sensor elements which are disposed on an oscillatable body; a regulated oscillator loop which sets at least one of the sensor elements into constant oscillation, thereby exciting the oscillatable body as well; a damping stage, which communicates with at least one sensor element, and an output stage, which communicates with at least one further sensor element and outputs an output voltage that is a measure for the rate of rotation to be ascertained; means for detecting a malfunction which can be activated, which by generating an offset signal trip a predeterminable mistuning of the device and lead to an output voltage that is a superposition of the rotation rate and offset and is evaluated for error detection; the oscillatable body is cylindrical and is freely oscillating on one end while it is fixed fastened on the other; and the sensor elements are disposed in a single track uniformly on the surface of the cylinder.

2. The device of claim 1; and further comprising means for performing an electronic zero point adjustment, and/or an offset a calibration.

3. The device of claim 1 wherein the oscillator loop (17) includes an electronic excitation loop (26).

4. The device of claim 1, wherein the damping loop (18) is an electronic damping loop with phase control and constant gain.

5. The device of claim 1; and further comprising, located at the input to the output stage (19), a block (27) with constant gain, which block is connected to an oscillator loop (17) and the damping loop (18), and via these connections the voltages ($U_{F,O}$) and ($U_{F,D}$) are supplied; the block (27) is connected via the point (28) for an offset calibration to an amplifier (29) with variable gain, by way of which a sensitivity calibration is possible and at whose output the voltage ($U_{rate}$) to be evaluated can be picked up.

6. A device for ascertaining a rate of rotation, comprising a sensor that has a plurality of sensor elements which are disposed on an oscillatable body; a regulated oscillator loop which sets at least one of the sensor elements into constant oscillation, thereby exciting the oscillatable body as well; a damping stage, which communicates with at least one sensor element, and an output stage, which communicates with at least one further sensor element and outputs an output voltage that is a measure for the rate of rotation to be ascertained; means for detecting a malfunction which can be activated, which by generating an offset signal trip a predeterminable mistuning of the device and lead to an output voltage that is a superposition of the rotation rate and offset and is evaluated for error detection; the means for generating an offset signal are integrated with the sensor electronics and include a BITE block (16), having an amplifier (20) with variable gain and a switch (21) by way of which the offset signal can be carried onward, the input of the amplifier (20) of the BITE block (16) is connected to the oscillator loop (17); via this connection, the voltage ($U_{S,\,O}$) located at the input of the oscillator loop is supplied; the BITE block (16) is connected to the damping loop (18), and via this connection the offset voltage ($U_{BITE}$) is supplied to the damping loop (18).

* * * * *